US010730213B2

(12) United States Patent
Chen et al.

(10) Patent No.: US 10,730,213 B2
(45) Date of Patent: Aug. 4, 2020

(54) INCLINED TYPE INJECTION MOLDING MACHINE

(71) Applicant: Guangdong Weida Intelligent Equipment Co., Ltd., Shantou, Guangdong Province (CN)

(72) Inventors: Hanrui Chen, Shantou (CN); Yongjun Huang, Shantou (CN); Zhongtiao Chen, Shantou (CN)

(73) Assignee: GUANGDONG WEIDA INTELLIGENT EQUIPMENT CO., LTD., Shantou (CN)

(*) Notice: Subject to any disclaimer, the term of this patent is extended or adjusted under 35 U.S.C. 154(b) by 126 days.

(21) Appl. No.: 15/565,137

(22) PCT Filed: Aug. 10, 2015

(86) PCT No.: PCT/CN2015/086504
§ 371 (c)(1),
(2) Date: Oct. 6, 2017

(87) PCT Pub. No.: WO2016/161732
PCT Pub. Date: Oct. 13, 2016

(65) Prior Publication Data
US 2018/0099438 A1    Apr. 12, 2018

(30) Foreign Application Priority Data

Apr. 8, 2015   (CN) ............................ 2015 1 0162383
Apr. 8, 2015   (CN) ..................... 2015 2 0206076 U
(Continued)

(51) Int. Cl.
*B29C 45/07*      (2006.01)
*B29C 45/32*      (2006.01)

(52) U.S. Cl.
CPC .............. *B29C 45/07* (2013.01); *B29C 45/32* (2013.01)

(58) Field of Classification Search
CPC ................................ B29C 45/07; B29C 45/32
See application file for complete search history.

(56) References Cited

U.S. PATENT DOCUMENTS 3,642,403 A * 2/1972  Havlik .................... B29C 45/54
                                                    425/145
4,207,051 A * 6/1980  Wright .................... B29C 45/32
                                                    249/67
(Continued)

FOREIGN PATENT DOCUMENTS

CN       2377067 Y  *  5/2000
CN       2377067 Y      5/2000
(Continued)

OTHER PUBLICATIONS

Machine Translation CN203844160 (Year: 2014).*
(Continued)

*Primary Examiner* — Matthew J Daniels
*Assistant Examiner* — Wayne K. Swier
(74) *Attorney, Agent, or Firm* — Loza & Loza, LLP; Michael F. Fedrick

(57) ABSTRACT

An inclined type injection molding machine, comprising an injection part with a glue injection spray nozzle, an injection platform seat and a rack. The rack comprises a die closing and locking mechanism configured to install a die having a die pouring gate on the top center of the die. The injection platform seat has a horizontal base and an inclined surface, and the injection part is erected on the inclined surface with the injection platform seat horizontally erected at the part of the rack. The central line of the injection part is inclined to the central line of the die closing and locking mechanism, and the die closing and locking mechanism drives the die to (Continued)

perform a die opening and die closing motion in which the glue injection spray nozzle is able to keep contact with or be separated from the die pouring gate.

18 Claims, 3 Drawing Sheets

(30) Foreign Application Priority Data

May 19, 2015 (CN) .................... 2015 2 0322893 U
Jul. 13, 2015 (CN) .......................... 2015 1 0408066

(56) References Cited

U.S. PATENT DOCUMENTS

| | | | | |
|---|---|---|---|---|
| 4,408,981 A * | 10/1983 | Brown | ................ | B29C 45/1761 |
| | | | | 425/338 |
| 5,234,332 A * | 8/1993 | Hoenke | ............... | B30B 15/0064 |
| | | | | 425/338 |
| 6,171,094 B1 * | 1/2001 | Von Holdt | .......... | B29C 45/1761 |
| | | | | 425/190 |
| 6,439,871 B1 * | 8/2002 | Saito | ................ | B29C 45/14065 |
| | | | | 425/112 |
| 7,208,219 B2 * | 4/2007 | Polk, Jr. | .................. | B29C 43/34 |
| | | | | 428/292.1 |
| 2009/0155406 A1 * | 6/2009 | Teng | ....................... | B29C 45/32 |
| | | | | 425/592 |
| 2009/0304841 A1 * | 12/2009 | Eigler | ..................... | B29C 45/32 |
| | | | | 425/150 |
| 2012/0306112 A1 * | 12/2012 | Tokuyama | ............ | B29C 45/768 |
| | | | | 264/40.5 |

FOREIGN PATENT DOCUMENTS

| | | | | |
|---|---|---|---|---|
| CN | 102909819 | | 2/2013 | |
| CN | 103192485 A | | 7/2013 | |
| CN | 203844160 U | * | 9/2014 | ............ B29C 45/17 |
| CN | 203844160 U | | 9/2014 | |
| CN | 105058682 A | | 11/2015 | |
| GB | 1419460 A | * | 12/1975 | ............ B29C 45/10 |
| WO | WO-2009051095 A1 | * | 4/2009 | ............ B29C 45/17 |

OTHER PUBLICATIONS

Machine Translation CN2377067 (Year: 2000).*
Machine Translation WO2009051095 (Year: 2009).*
International Search Report, International Patent Application No. PCT/CN2015/086504, dated Jan. 12, 2016.
International Written Opinion, International Patent Application No. PCT/CN2015/086504, dated Jan. 12, 2016.
Wang, Z. et al., Research of laminated injection mold, China Rubber/Plastics Technology and Equipment, 32:1, pp. 38-43.

* cited by examiner

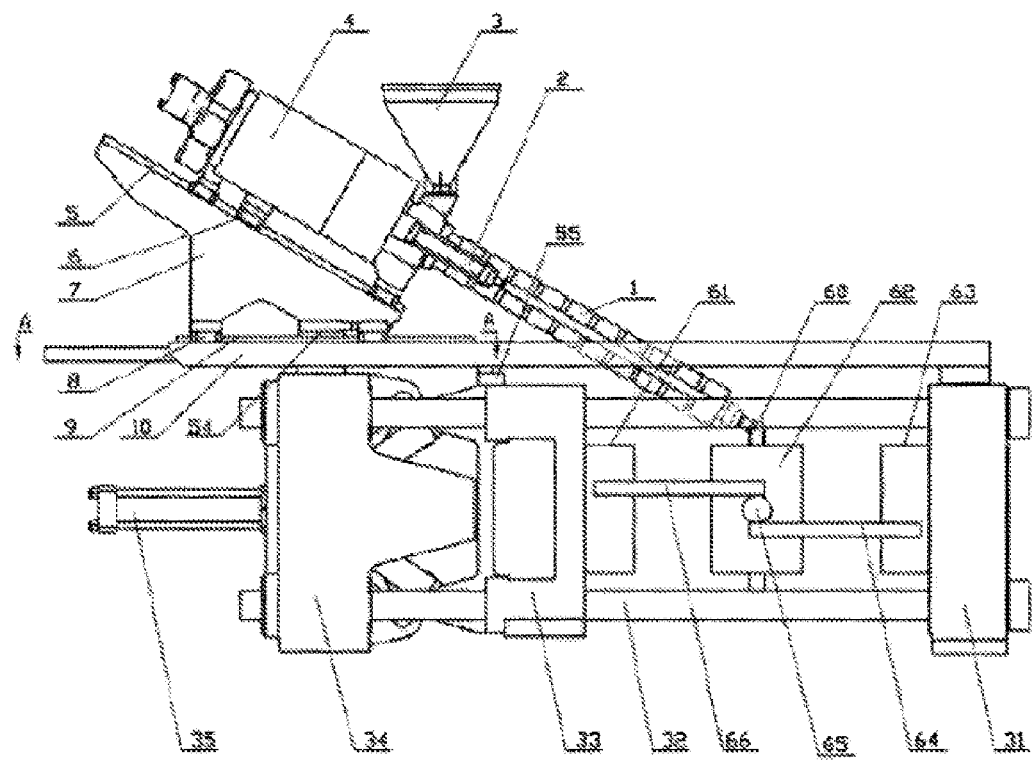
Figure 1
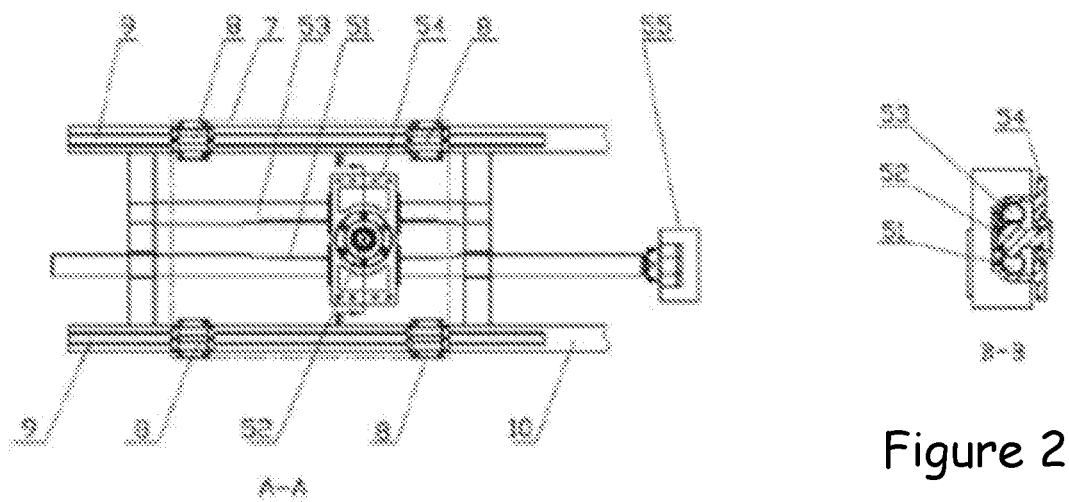
Figure 2B
Figure 2A

INCLINED TYPE INJECTION MOLDING MACHINE

CROSS-REFERENCE TO RELATED APPLICATIONS

This application is the U.S. national stage of International Patent Application No. PCT/CN2015/086504, filed on Aug. 10, 2015 and entitled INCLINED TYPE INJECTION MOLDING MACHINE, which claims the benefit of priority under 35 U.S.C. § 119 from the following patent applications: Chinese Patent Application No. 201510162383.7, filed Apr. 8, 2015; Chinese Patent Application No. 201520206076.X, filed Apr. 8, 2015; Chinese Patent Application No. 201520322893.1, filed May 19, 2015; and Chinese Patent Application No. 201510408066.9, filed Jul. 13, 2015. The disclosures of the foregoing applications are incorporated herein by reference in their entirety.

FIELD OF THE INVENTION

The present invention relates to the field of plastic product manufacturing technology, and in particular to an inclined type injection molding machine.

BACKGROUND OF THE INVENTION

Horizontal injection molding machines are widely used in the field of plastic product manufacturing technology for manufacturing plastic products.

The axis of a screw of the horizontal injection molding machine and a motion axis of a die closing device thereof are arranged in a horizontal line. This device has the advantages of low machine body and easy operation and maintenance; the machine is stable because of lower gravity center; and the formed product can automatically drop down due to the weight, therefore full automatic operation is easy to realize. In addition, in combination with laminated die technology, cavities are distributed on two or more layers and are arranged in an overlapping manner, which is equivalent to laminating a plurality of dies together, therefore the yield of the machine of the same tonnage is doubled, and thus compared with the ordinary injection die, the production efficiency and the equipment utilization rate can be greatly improved. However, this device has a large floor space, a pouring runner system is complex, it is difficult to solve the problem of pressure balance of the cavities, a pouring runner needs to penetrate through a parting surface, the pouring runner is difficult to seal after the die is opened, resulting in the defects that the injection molding process is instable, the rejection rate of products is high, the difference of quality of the products of the cavities is large, the quality of the products is reduced, and that the use economical efficiency of the equipment is reduced, etc.

SUMMARY OF THE INVENTION

A brief overview of the present invention is given below to provide a basic understanding of certain aspects of the present invention. It should be understood that this overview is not an exhaustive overview of the present invention. It is not intended to determine the critical or important part of the present invention, nor is it intended to limit the scope of the present invention. The aim is simply to give some concepts in a simplified form as a prelude to the more detailed description of the later discussion.

The present invention provides an inclined type injection molding machine, including an injection part, an injection platform seat and a rack, wherein the injection part includes a glue injection spray nozzle, the rack includes a die closing and locking mechanism, the die closing and locking mechanism includes a movable template and a fixed template, which are arranged in sequence and is configured to install a die between the movable template and the fixed template, and a die pouring gate is arranged on the center of the top part of the die, the injection platform seat is provided with a horizontal base and an inclined surface, the injection part is mounted on the inclined surface of the injection platform seat, the injection platform seat is horizontally mounted at the top part of the rack, the injection part and the die closing and locking mechanism are located in a same vertical plane, the central line of the injection part is inclined to the central line of the die closing and locking mechanism, and the die closing and locking mechanism drives the die to perform die opening and die closing motion, and in die opening and die closing motion process of the die, the glue injection spray nozzle of the injection part is able to keep contact with or be separated from the die pouring gate.

Further, the injection part further includes an injection movement oil cylinder, and the injection movement oil cylinder can drive the injection part to move upward or downward along the inclined surface of the injection platform seat.

Further, the die is a laminated die.

Further, the laminated die includes a fixed die plate, a middle die plate and a movable die plate, which are arranged in sequence, the displacement speeds of the middle die plate relative to the fixed die plate and the movable die plate are equal, and the injection platform seat can synchronously move with the middle die plate.

Further, the injection part includes a glue injection mechanism configured to drive glue injection, and the glue injection mechanism is fixedly connected with the middle die plate.

Further, the injection part includes injection movement piston rods arranged on both sides of the injection movement oil cylinder in parallel, the top of the die is provided with injection movement connecting seats, and the injection movement piston rods are fixedly connected with the injection movement connecting seats correspondingly.

Further, the injection part includes injection movement piston rods arranged on both sides of the injection movement oil cylinder in parallel, the top of the die is provided with injection movement connecting seats, and the injection movement piston rods are correspondingly hinged with the injection movement connecting seats.

Further, the top of the rack is provided with a horizontal guide rail, and the injection platform seat horizontally moves along the top of the rack through a guide rail pair formed by an injection platform guide rail and an injection platform guide rail slide block.

Further, the inclined surface of the injection platform seat is provided with a guide rail, and the injection part moves along the inclined surface of the injection platform seat through a guide rail pair formed by a glue injection guide rail and a glue injection guide rail slide block.

Further, the inclined type injection molding machine further includes a differential connecting mechanism, and the differential connecting mechanism is configured to connect the movable template of the die closing and locking mechanism with the injection platform seat for transferring the motion of the die to the injection part.

Further, the differential connecting mechanism includes an injection platform driving rack fixing seat, an injection platform driving rack, an injection platform gear, an injection platform gear seat and a guide rack, the injection platform driving rack fixing seat is connected with the movable template of the die closing and locking mechanism, the movable template moves to drive the injection platform driving rack to move, the driving rack is engaged with the injection platform gear to drive the injection platform gear seat to move, and the injection platform gear seat transfers the motion of the injection platform driving rack fixing seat under the action of the injection platform guide rack.

Further, the displacement of the motion of the injection platform gear seat is a half of that of the injection platform driving rack fixing seat.

Further, the injection part is arranged above the movable template or above the fixed template.

The technical solution of the present invention can not only omit the step that the glue injection spray nozzle needs to be continuously in contact with the die pouring gate again so as to increase the production efficiency and meet the needs of an injection molding technology, but also has a small floor space, in combination with the use of a laminated die, injection molding can be performed from the pouring gate on the middle die plate without penetrating through the parting surface, therefore the pouring runner system is simple, the pressure balance of the cavities is good, the injection molding process is stable, the percent of pass of the products is high, the quality consistency of the products of the cavities is good, the quality of the products is improved, and the cost is lower.

BRIEF DESCRIPTION OF THE DRAWINGS

The above and other objectives, features and advantages of the present invention will be more readily understood with reference to the following description of embodiments of the invention taken in conjunction with the drawings. The components in the drawings are for the purpose of illustrating the principles of the present invention. In the drawings, the same or similar technical features or components will be denoted by the same or similar reference signs.

FIG. 1 is a structure diagram of an inclined type injection molding machine provided according to an embodiment of the present invention in a die opening state;

FIG. 2A is a top view of a differential connecting mechanism along an A-A section in FIG. 1;

FIG. 2B is a sectional view of a gear seat along a B-B section in FIG. 1;

REFERENCE SIGNS

Figure 3:
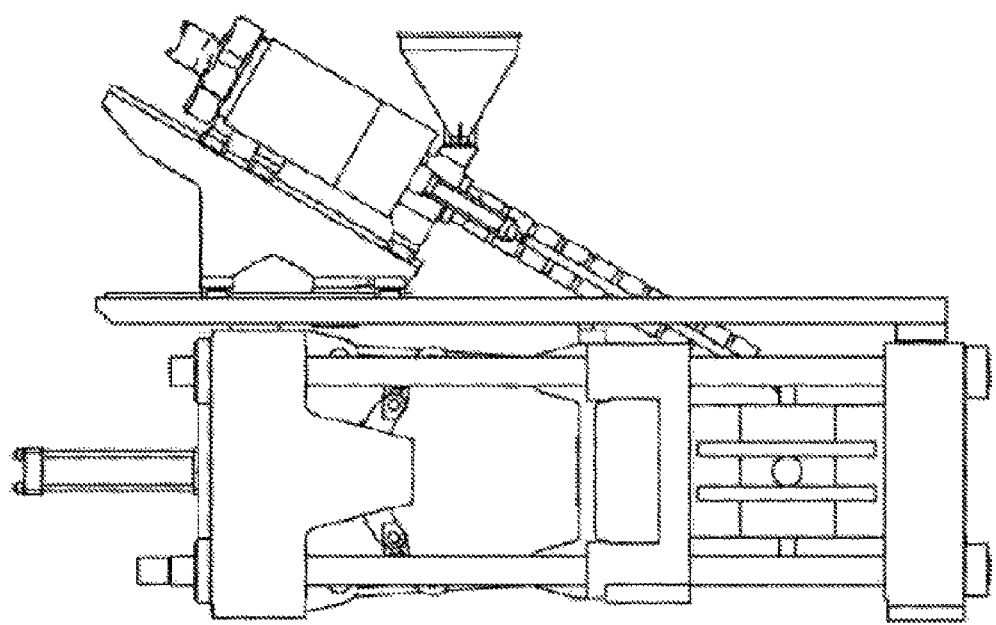
FIG. 3 is a structure diagram of an inclined type injection molding machine provided according to an embodiment of the present invention in a die closing state.

| 1. glue melting cylinder | 2. injection movement oil cylinder | 3. blanking hopper |
|---|---|---|
| 4. glue injection mechanism | 5. glue injection guide rail | 6. glue injection guide rail slide block |
| 7. injection platform seat | 8. injection platform guide rail slide block | 9. injection platform guide rail |
| 10. injection platform support | 11. glue injection spray nozzle | 12. injection movement connecting seat |
| 31. fixed template | 32. pull rod | 33. movable template |
| 34. back template | 35. die locking oil cylinder | 51. injection platform driving rack |
| 52. injection platform gear | 53. injection platform guide rack | 54. injection platform gear seat |
| 55. injection platform driving rack fixing seat | 60. die pouring gate | 61. movable die plate |
| 62. middle die plate | 64. fixed die plate | 65. die gear |
| 66. die rack | | |

DETAILED DESCRIPTION OF THE EMBODIMENTS

The embodiments of the present invention will be described below with reference to the drawings. Elements and features described in one drawing or one embodiment of the present invention may be combined with the elements and features shown in one or more other drawings or embodiments. It should be noted that for the purpose of clarity, the expression and description of components and processing known to those of ordinary skill in the art and irrelevant to the present invention are omitted from the drawings and the description.

FIG. 1 is a structure diagram of an inclined type injection molding machine provided according to an embodiment of the present invention in a die opening state. The inclined type injection molding machine includes an injection part, an injection platform seat, a rack and a differential connecting mechanism, the injection part is mounted on the injection platform seat and is arranged on the upper part of the rack, and the differential connecting mechanism connects the rack with an injection feeding device.

The injection part includes a glue injection mechanism 4, a blanking hopper 3, an injection movement oil cylinder 2, a glue melting cylinder 1 and a glue injection spray nozzle 11 which are rigidly connected in sequence. The glue injection mechanism 4 and the glue injection spray nozzle 11 are respectively installed on two ends of the injection part, and the blanking hopper 3 is installed on one end of the glue injection mechanism 4 and is configured to input feed. The glue injection mechanism 4 firstly pushes the feed to the glue melting cylinder 1, the feed is melted in the glue melting cylinder 1, and glue injection is performed by the glue injection spray nozzle 11. The injection part is arranged at the top of a die closing part of the rack through the injection platform seat 7. The injection movement oil cylinder 2 is configured to drive the injection part to move upward or downward along the injection platform seat so as to realize reliable contact or separation of the glue injection spray nozzle 11 and a die pouring gate 60.

The surface of the injection platform seat 7 is provided with an inclined guide rail that is low at the front part and is high at the back part, the inclined guide rail forms an angle of about 30 degrees with the horizontal plane, the inclination angle can be adjusted between 0-80 degrees according to process needs, for example, 45 degrees, 55 degrees. The injection part is mounted on the injection platform seat 7 through a linear guide rail pair (inclined surface) formed by a glue injection guide rail slide block 5 and a glue injection guide rail 6. The injection part can linearly slide along the inclined guide rail. For example, during initial feeding, the injection movement oil cylinder can drive the injection part to move upward along the inclined guide rail, the waste feed or polluted feed in the glue melting cylinder 1 is discharged from the glue injection spray nozzle 11 through a glue injection operation of the glue injection mechanism 4, and then the injection part is moved downward along the inclined guide rail to a working position to perform normal work. The glue injection mechanism 4, the blanking hopper 3, the glue melting cylinder 1 and the glue injection spray nozzle 11 can also be movably connected, as long as they synchronously move relative to the inclined guide rail of the injection platform seat 7.

The rack includes an engine base, a pull rod 32, an injection platform support 10 and a die closing and locking mechanism, whose central axes are parallel to each other. The engine base supports the whole injection molding machine. The pull rod 32 is configured to install the die closing part of the die closing and locking mechanism and providing a guide rail for the die closing part in die opening and die closing motion. The injection platform support 10 is located at a position close to the top of a movable template 33 of the die closing part on the rack and is provided with a horizontal guide rail on the surface. The injection platform seat 7 is mounted on the injection platform support 10 through a linear guide rail pair (horizontal) formed by an injection platform guide rail slide block 8 and an injection platform guide rail 9, and can perform horizontal linear motion along the injection platform support 10. The die closing and locking mechanism includes a die locking oil cylinder 35, the pull rod 32 and the die closing part, which are all installed on the engine base, and the die locking oil cylinder 35 drives the movable template 33 of the die closing part to move along the axial direction of the pull rod 32 through a transmission mechanism to realize die opening and die closing, as shown in FIG. 1 and FIG. 3.

The differential connecting mechanism is configured to rigidly connect the movable template 33 of the die closing part in the die closing and locking mechanism with the injection platform support 10 of the rack so as to transfer the motion of the movable template 33 to the injection part through the injection platform seat. FIG. 2 shows a top view of the differential connecting mechanism along an A-A section in FIG. 1. For the sake of clarity, a sectional view of a gear seat along a B-B section in the figure is also shown. One embodiment of the differential connecting mechanism is as follows: the differential connecting mechanism is installed on the rack and includes an injection platform driving rack fixing seat 55, an injection platform driving rack 51, an injection platform gear 52, an injection platform gear seat 54 and a guide rack 53. The injection platform driving rack fixing seat 55 is connected to the movable template 33, the movable template 33 moves to drive the injection platform driving rack 51 to move in die opening and die closing motion under the drive of the die closing and locking mechanism, and the driving rack 51 is engaged with the injection platform gear 52 to drive the injection platform gear seat 54 to move. As the injection platform gear seat 54 is rigidly connected with the injection platform support 10, the motion (the movable template 33) of the injection platform driving rack fixing seat 55 is transferred to the injection platform gear seat 54 (the injection platform seat) under the action of the injection platform guide rack 53. In the case that a following laminated die is installed on the injection molding machine, the differential connecting mechanism can be configured, so that the displacement of the motion of the injection platform gear seat 54 is a half of that of the injection platform driving rack fixing seat 55, namely, a half of the displacement of the motion of the movable template 33, accordingly, the displacements and speeds of the motion of the injection platform seat is a half of the displacements and speeds of the motion of the movable template 33, and the synchronous motion of the injection part mounted on the injection platform seat and a middle die plate of the installed laminated die is realized.

The central line of the die closing part of the die closing and locking mechanism and the central line of the injection part are located on a same vertical plane. The die closing part includes a fixed template 31 and the movable template 33. The fixed template 31 is fixedly installed on the engine base, and the movable template 33 can horizontally and linearly move along the pull rod 32 and is rigidly connected to the differential connecting mechanism. A laminated die for injection molding is installed between the fixed template 31 and the movable template 33. The laminated die includes a fixed die plate 63, the middle die plate 62, a movable die plate 61, pouring runners (no shown) and a die linkage mechanism. The middle die plate 62 is arranged between the fixed die plate 63 and the movable die plate, and the fixed die plate 63 and the movable die plate 61 are connected by the die linkage mechanism. Due to the die linkage mechanism, when the laminated die is opened (die opening) along the horizontal direction, the displacement and speed of the middle die plate 62 are kept to be a half of that of the movable template 33. The die linkage mechanism can be a gear connecting rod mechanism. For example, a die gear 64, a die gear 65 and a gear rack 66 of the die linkage mechanism are symmetrically arranged on the middle die plate 62. Under the action of the die linkage mechanism, the displacements and speeds of the middle die plate 62 relative to the movable die plate 61 and the fixed die plate 63 are equal.

The die pouring gate of the laminated die is arranged on the top part of the center of the middle die plate, the pouring runners are symmetrically arranged on the middle die plate 62, which shortens the cavity differences from the pouring runners to the fixed die plate 63 and the movable die plate 61 and reduces the pressure loss, the pouring runners are simple, and the pressure balance problem of the cavities is solved. Moreover, by means of this configuration, the pouring runners do not need to pass by a parting surface, and thus there is no runner sealing problem after the die is opened. However, in frequent die opening and die closing motion (motion of the movable template), the glue injection spray nozzle needs to be continuously contacted with the die pouring gate again, and how to keep the continuous contact between the glue injection spray nozzle 11 of the injection part and the die pouring gate 60 of the die will be illustrated below in more detail.

FIG. 1 and FIG. 3 respectively show the structure diagrams of the inclined type injection molding machine according to the present invention in a die opening state and a die closing state. When the laminated die is applied, during die opening, the movable template moves toward a direction away from the fixed template under the drive of the die closing and locking mechanism, and the middle die plate departs from the fixed template at a displacement and speed correspondingly equal to a half of the displacement and speed of the movable template to depart from the fixed template under the action of the die linkage mechanism; and during die closing, the movable template moves toward a direction close to the fixed template under the drive of the die closing and locking mechanism, and the middle die plate approaches to the fixed template at a displacement and speed correspondingly equal to a half of the displacement and speed of the movable template to depart from the fixed template under the action of the die linkage mechanism, until the cavity is closed and sealed. As mentioned above, because of the configuration of the differential connecting mechanism, the displacement of the motion of the injection platform gear seat 54 of the differential connecting mechanism is a half of that of the injection platform driving rack fixing seat 55, namely, the displacement of the injection platform seat can be a half of the displacement of the motion of the movable template 33, and the synchronous motion of the injection part mounted on the injection platform seat and the middle die plate of the installed laminated die is realized. Meanwhile, the injection movement oil cylinder 2 drives the injection part to move upward or downward to a proper position along the inclined surface of the inclined injection platform seat 7, and then the reliable contact between the glue injection spray nozzle 11 of the injection part and the die pouring gate 60 can be guaranteed. The injection movement oil cylinder 2 can also drive the injection part to move upward on the inclined surface of the inclined injection platform seat 7 according to process needs so as to separate the glue injection spray nozzle 11 from the die pouring gate 60, for example, the need of clearing waste feed prior to the working.

Figure 4:
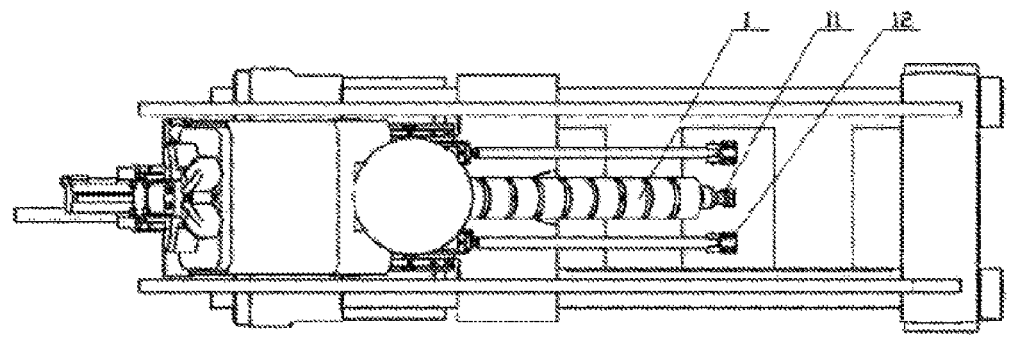
FIG. 4 is a top view of an inclined type injection molding machine provided according to an embodiment of the present invention in a die opening state.

Further, one or more injection movement connecting seats 12 can be arranged at the top of the middle die plate 62 of the laminated die, as shown in FIG. 4, and are fixedly connected or hinged with injection movement piston rods 2 arranged on two sides of the glue melting cylinder (along the longitudinal axis) of the injection movement oil cylinder so as to promote the contact or separation of the glue injection spray nozzle 11 and the die pouring gate 60.

Further, the injection movement oil cylinder 2 can be fixedly connected with the middle die plate 62 and does not move, therefore when the die is in a die opening and closing process, the glue injection spray nozzle 11 is kept in contact with the pouring runners of the middle die plate, which can omit the step of repeatedly and continuously contacting the two components so as to improve the production efficiency and meet the needs of the injection molding technology.

Both the linear guide rail pair (inclined surface) formed by the glue injection guide rail 5 and the glue injection guide rail slide block 6 and the linear guide rail pair (horizontal) formed by the injection platform guide rail slide block 8 and the injection platform guide rail 9 are liner guide rail pairs, but other guide rail structures can also be adopted.

The inclined type injection molding machine adopting the above novel structure not only has a small floor area and is applied to the field of laminated dies, the pouring runner system is simple, the pressure balance of the cavities is good, the injection molding process is stable, the percent of pass of the products is high, the quality consistency of the products of the cavities is good, the quality of the products is improved, and the cost is lower.

Figure 5:
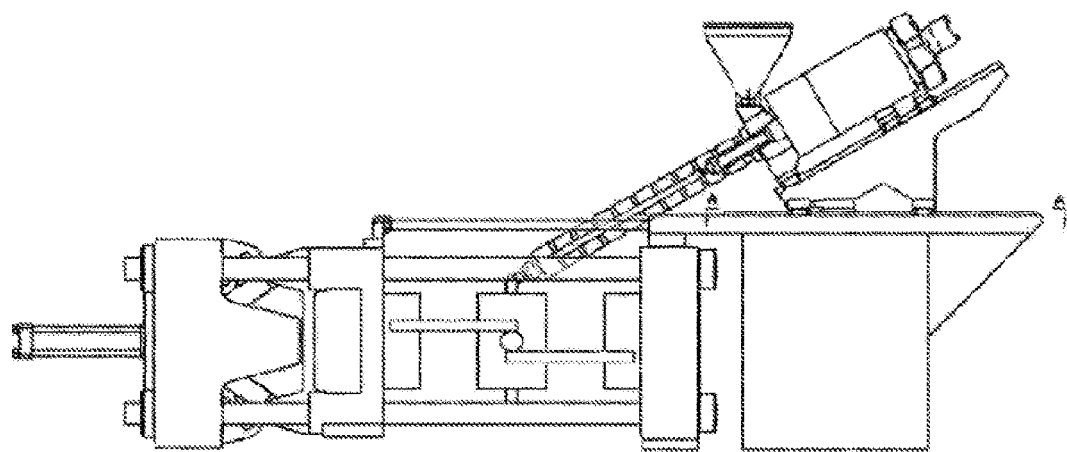
FIG. 5 is a structure diagram of an inclined type injection molding machine provided according to another embodiment of the present invention in a die opening state.

FIG. 5 is a structure diagram of an inclined type injection molding machine provided according to another embodiment of the present invention in a die opening state. The difference of the embodiment with the above embodiment lies in that, in the above embodiment, the injection part and the injection platform seat are arranged above the movable template 33 and a back template 34 of the die locking part, and in the present embodiment, the injection part and the injection platform seat are arranged above the fixed template 31 of the die locking part.

Such a structure can similarly realize the effect of omitting the step that the glue injection spray nozzle needs to be continuously in contact with the die pouring gate again so as to improve the production efficiency and meet the needs of the injection molding process, moreover, the floor area is small, in combination with the use of the laminated die, injection molding can be performed from the pouring gate on the middle die plate without penetrating through the parting surface, therefore the pouring runner system is simple, the pressure balance of the cavities is good, the injection molding process is stable, the percent of pass of the products is high, the quality consistency of the products of the cavities is good, the quality of the products is improved, and the cost is lower.

Optionally, the injection platform seat and the injection part are integrally designed or fixedly connected, that is, the injection platform seat and the injection part are constituted into a new injection part on the whole, the central line of the new injection part excluding the injection platform seat still keeps a certain inclination angle relative to the central line of the die closing part on the horizontal direction, for example, 30 degrees, the new injection part can perform horizontal linear motion relative to the injection platform support, and the technical solution of the present invention can also be achieved.

Those of ordinary skill in the art can understand that the above-described parts, devices, components and technical means can be combined with one another to achieve different technical solutions. The present invention can also be applied to other types of injection molding machines, differential connecting mechanisms or dies by applying the principles of the present invention through equivalent substitutions of conventional technical means in the art.

Finally, it should be noted that the above-mentioned embodiments are merely used for illustrating the technical solutions of the present invention, rather than limiting them; although the present invention has been described in detail with reference to the foregoing embodiments, those of ordinary skill in the art should understand that they could still make modifications to the technical solutions recorded in the foregoing embodiments or make equivalent substitutions to a part of technical features; and these modifications or substitutions do not make the essence of the corresponding technical solutions depart from the spirit or scope of the technical solutions of the embodiments of the present invention.

The invention claimed is:

1. An inclined type injection molding machine, comprising:
   an injection part,
   an injection platform seat, and
   a rack,
      wherein the injection part comprises a glue injection spray nozzle, the rack comprises a die closing and locking mechanism, the die closing and locking mechanism comprises a movable template and a fixed template, which are arranged in sequence and configured to install a laminated die between the movable template and the fixed template, and a die pouring gate is arranged on the center of the top part of the die,
      wherein the injection platform seat is provided with a horizontal base and an inclined surface, the injection part is mounted on the inclined surface of the injection platform seat and is able to slide upward or downward along the inclined surface of the injection platform seat, the injection platform seat is mounted on an injection platform support at the top part of the rack and is able to move horizontally along the injection platform support, the injection part and the die closing and locking mechanism are located in a same vertical plane, the central line of the injection part is inclined to the central line of the die closing and locking mechanism, and the die closing and locking mechanism drives the die to perform die opening and die closing motion, wherein in a die opening and die closing motion process of the die, the glue injection spray nozzle of the injection part is able to keep contact with or be separated from the die pouring gate, and wherein the laminated die comprises a fixed die plate, a middle die plate and a movable die plate, which are arranged in sequence, the displacement speeds of the middle die plate relative to the fixed die plate and the movable die plate are equal, and the injection part mounted on the injection platform seat can synchronously move with the middle die plate; and wherein the inclined type injection molding machine further comprises a differential connecting mechanism, and the differential connecting mechanism is configured to rigidly connect the movable template of the die closing and locking mechanism with the injection platform support for transferring the motion of the movable template to the injection platform seat.

2. The inclined type injection molding machine of claim 1, wherein the injection part further comprises an injection movement oil cylinder, and the injection movement oil cylinder can drive the injection part to move upward or downward along the inclined surface of the injection platform seat.

3. The inclined type injection molding machine of claim 1, wherein the injection part comprises a glue injection mechanism configured to drive glue injection, and the glue injection mechanism is fixedly connected with the middle die plate.

4. The inclined type injection molding machine of claim 2, wherein the injection part comprises injection movement piston rods arranged on both sides of the injection movement oil cylinder in parallel, the top of the die is provided with injection movement connecting seats, and the injection movement piston rods are fixedly connected with the injection movement connecting seats correspondingly.

5. The inclined type injection molding machine of claim 2, wherein the injection part comprises injection movement piston rods arranged on both sides of the injection movement oil cylinder in parallel, the top of the die is provided with injection movement connecting seats, and the injection movement piston rods are correspondingly hinged with the injection movement connecting seats.

6. The inclined type injection molding machine of claim 1, wherein the top of the rack is provided with a horizontal guide rail, and the injection platform seat horizontally moves along the top of the rack through a guide rail pair formed by an injection platform guide rail and an injection platform guide rail slide block.

7. The inclined type injection molding machine of claim 1, wherein the inclined surface of the injection platform seat is provided with a guide rail, and the injection part moves along the inclined surface of the injection platform seat through a guide rail pair formed by a glue injection guide rail and a glue injection guide rail slide block.

8. The inclined type injection molding machine of claim 1, wherein, the differential connecting mechanism comprises an injection platform driving rack fixing seat, an injection platform driving rack, an injection platform gear, an injection platform gear seat and a guide rack, wherein the injection platform driving rack fixing seat is connected with the movable template of the die closing and locking mechanism, the movable template moves to drive the injection platform driving rack to move, the driving rack is engaged with the injection platform gear to drive the injection platform gear seat to move, and the injection platform gear seat transfers the motion of the injection platform driving rack fixing seat under the action of the injection platform guide rack.

9. The inclined type injection molding machine of claim 8, wherein the displacement of the motion of the injection platform gear seat is a half of the displacement of the injection platform driving rack fixing seat.

10. The inclined type injection molding machine of claim 1, wherein the injection part is arranged above the movable template or above the fixed template.

11. The inclined type injection molding machine of claim 2, wherein the inclined type injection molding machine further comprises a differential connecting mechanism, and the differential connecting mechanism is configured to connect the movable template of the die closing and locking mechanism with the injection platform support for transferring the motion of the movable template to the injection platform seat.

12. The inclined type injection molding machine of claim 3, wherein the inclined type injection molding machine further comprises a differential connecting mechanism, and the differential connecting mechanism is configured to connect the movable template of the die closing and locking mechanism with the injection platform support for transferring the motion of the movable template to the injection platform seat.

13. The inclined type injection molding machine of claim 4, wherein the inclined type injection molding machine further comprises a differential connecting mechanism, and the differential connecting mechanism is configured to connect the movable template of the die closing and locking mechanism with the injection platform support for transferring the motion of the movable template to the injection platform seat.

14. The inclined type injection molding machine of claim 5, wherein the inclined type injection molding machine further comprises a differential connecting mechanism, and the differential connecting mechanism is configured to connect the movable template of the die closing and locking mechanism with the injection platform support for transferring the motion of the movable template to the injection platform seat.

15. The inclined type injection molding machine of claim 2, wherein the injection part is arranged above the movable template or above the fixed template.

16. The inclined type injection molding machine of claim 3, wherein the injection part is arranged above the movable template or above the fixed template.

17. The inclined type injection molding machine of claim 4, wherein the injection part is arranged above the movable template or above the fixed template.

18. The inclined type injection molding machine of claim 5, wherein the injection part is arranged above the movable template or above the fixed template.

* * * * *